United States Patent
Faist et al.

(10) Patent No.: US 11,336,649 B2
(45) Date of Patent: May 17, 2022

(54) METHOD AND APPARATUS FOR PROVIDING ACCESS INFORMATION FOR AN ACCESS TO A FIELD DEVICE FOR PROCESS INDUSTRY

(71) Applicant: VEGA Grieshaber KG, Wolfach (DE)

(72) Inventors: Fridolin Faist, Oberwolfach (DE); Jakob Hummel, Elzach (DE); Ralf Hoell, Titisee-Neustadt (DE)

(73) Assignee: VEGA Grieshaber KG, Wolfach (DE)

( * ) Notice: Subject to any disclaimer, the term of this patent is extended or adjusted under 35 U.S.C. 154(b) by 89 days.

(21) Appl. No.: 16/667,558

(22) Filed: Oct. 29, 2019

(65) Prior Publication Data
US 2020/0162468 A1 May 21, 2020
US 2021/0185044 A9 Jun. 17, 2021

(30) Foreign Application Priority Data

Oct. 29, 2018 (EP) .................................... 18203150

(51) Int. Cl.
*G06F 15/173* (2006.01)
*H04L 29/06* (2006.01)
(Continued)

(52) U.S. Cl.
CPC ............ *H04L 63/101* (2013.01); *H04L 51/22* (2013.01); *H04L 51/24* (2013.01)

(58) Field of Classification Search
CPC ....... H04L 63/101; H04L 51/22; H04L 51/24; H04L 67/125; G06F 2221/2141;
(Continued)

(56) References Cited

U.S. PATENT DOCUMENTS 10,037,339 B1 * 7/2018 Kleinpeter .......... G06F 16/1744
2002/0147813 A1 10/2002 Teng et al.
(Continued)

FOREIGN PATENT DOCUMENTS

DE 10 2012 109 348 A1 4/2014
DE 10 2013 111 690 A1 5/2015
(Continued)

OTHER PUBLICATIONS

Extended European Search Report dated May 9, 2019 in European Patent Application No. 18203150.0 (with English translation), 10 pages.
(Continued)

*Primary Examiner* — John B Walsh
(74) *Attorney, Agent, or Firm* — Oblon, McClelland, Maier & Neustadt, L.L.P.

(57) ABSTRACT

A method for providing access information for access to a field device for process automation is disclosed. The method includes the steps of determining, at a users operating device, at least one access information issued to the user for an access to at least one field device via the operating device, assigning, at the users operating device, a further user to the determined at least one access information, and sending an access permission comprising information relating to the determined at least one access information and to the further user assigned to the determined access information such that the determined at least one access information is provided to the further user based on the access permission.

20 Claims, 3 Drawing Sheets

(51) Int. Cl.
*H04L 51/42* (2022.01)
*H04L 51/224* (2022.01)

(58) Field of Classification Search
CPC ........ G06F 21/44; G06F 21/45; G06F 21/604;
G06F 21/6209; G05B 2219/24154; G05B
2219/24167; G05B 19/0423
See application file for complete search history.

(56) References Cited

U.S. PATENT DOCUMENTS

2017/0052522 A1* 2/2017 Klein .................... H04L 67/125
2019/0141399 A1* 5/2019 Auxer ................ H04N 21/4753

FOREIGN PATENT DOCUMENTS

| EP | 3 312 692 A1 | 4/2018 |
| WO | WO 02/052767 A2 | 7/2002 |
| WO | WO 2017/121928 A1 | 7/2017 |

OTHER PUBLICATIONS

Notice of first review opinion dated Mar. 23, 2022 in corresponding Chinese Patent Application No. 201911037325.6 (with English machine translation)(20 pages).

* cited by examiner

METHOD AND APPARATUS FOR PROVIDING ACCESS INFORMATION FOR AN ACCESS TO A FIELD DEVICE FOR PROCESS INDUSTRY

CROSS-REFERENCE TO RELATED APPLICATIONS

This application claims the benefit of the filing date of European Patent Application No. 18 203 150.0 filed on 29 Oct. 2018, the entire content of which is incorporated herein by reference.

TECHNICAL FIELD

The disclosure generally relates to the field of process automation and/or process industry. In particular, the disclosure relates to a method for providing and/or passing on access information for an access to a field device for process automation and/or process industry via an operating device of a user to a further user. Furthermore, the disclosure relates to a corresponding operating device and a program element for carrying out said method. Furthermore, the disclosure relates to a method for providing and/or passing on access information for an access to a field device of process automation via a server to a further user, as well as a corresponding server and a program element for carrying out said method.

BACKGROUND

Field devices are often used in process automation and/or the process industry to monitor and/or determine one or more process variables and/or measurement variables. For example, field devices can be used to determine a pressure of a medium, a level of a medium, a flow rate of a medium, a flow velocity of a medium, a temperature and/or other process variables.

Field devices are increasingly networked with each other and/or with other operating devices such as computers, smartphones, PCs, laptops and/or servers. In many cases, the field devices can be operated via hierarchically higher networks and/or via Internet connections using such operating devices. As a result, field devices can also be attacked by hackers. To counteract this situation, security mechanisms are regularly provided in the field devices and/or in the operating devices networked with the field devices. Such security mechanisms can range from a simple operating lock for on-site operation of the field devices, for example via a display with keys, to encrypted communication with authentication procedures and, if necessary, downstream access lock on the field devices. To increase security, access information for access to field devices can also be stored on a server and transferred to an operating device, for example, so that the operating device can access the field devices. In order to safely operate a system with one or more field devices and to be able to protect the field devices from unauthorized access, it may be advisable for a user to activate the authentication procedures, user administrations and/or other access protection functions implemented in the field devices. However, it may also be advisable to provide access information for accessing the field devices to all users of the field devices who wish to gain access to the field devices. Such access information may include various PINs, user names, passwords, and the like.

Such a procedure may remain manageable if relatively few field devices are used, but it can become confusing if a plant and/or equipment pool with a large number of field devices is to be managed and/or operated by a large number of users.

In order to counter this, it may in particular be planned to provide each user with all access information for all field devices of the plant locally on the operating device with which the field devices can be operated. Such storage of access information on operating devices can, for example, take the form of an allocation table of access information, such as PINs and/or passwords, to serial numbers of the field devices. It may also be provided that when a user repeatedly connects to a field device via the associated operating device, he no longer has to enter the access information required to access the field device on the operating device.

Users of field devices often have several computing devices, such as several operating devices, smartphones, tablet PCs, operating computers or the like, for operating the field devices. This may require the entry and/or storage of access information for the field devices for each computing device or operating device. This can also result in different levels of coverage of the access information on each of the operating devices, which can result in increased effort for the user and/or an operator of the system.

To counter this, servers are sometimes used on which user accounts can be stored for the users, whereby the user accounts can be used to manage the access information for field devices. A user can thus log on to the server with an operating device, for example to the user account of the user, in order to gain access to the access information stored on the server.

SUMMARY

The present disclosure provides for an improved method for passing on and/or providing access information for an access to a field device of process automation, an improved operating device and/or an improved server for carrying out the method.

This is achieved, in particular, by the subject-matter of the independent patent claims, wherein further embodiments are comprised in the dependent claims and in the following description.

The following disclosure concerns an interaction between at least one operating device for operating one or more field devices and a server with which the at least one operating device can communicate. The method performed by the operating device is specified, inter alia, in patent claim 1 and the method performed by the server is specified, inter alia, in patent claim 16. The following disclosure also concerns an operating device and a server. The following disclosure thus applies equally to the method from the point of view of the operating device, the method from the point of view of the server, the operating device and the server. In particular, it should be noted that the methods can be combined into a common method from the point of view of the operating device and from the point of view of the server.

One aspect relates to a method for providing, forwarding, lending, sharing, passing on and/or assigning access information for an access to a field device of process automation and/or process industry. The access information can be passed on and/or provided to a further user and/or a further users operating device via an operating device of the user. The method comprises the following steps:

determining, specifying and/or defining, on an operating device of a user, at least one access information issued, provided and/or assigned to the user for an access to at least one field device via the operating device of the user;

assigning, associating and/or linking, on the users operating device, a further user and/or a further operating device of a further user, to the determined at least one access information; and sending and/or transmitting an access permission and/or access release, which comprises information relating to the determined at least one access information and relating to the further user assigned to the determined access information, from the operating device to a server, so that the at least one access information, for example via the server, can be provided to the further user and/or the further operating device of the further user based on the access permission.

This allows sharing ("personal") access information for field devices assigned to a user with other users, such as service personnel and/or employees within a company, for example for accessing field devices in secured plant components, passing on access information to other users and/or granting access authorization to other users.

The user of the operating device can select on the server and/or on the operating device one or more access information for access to one or more field devices and send the access permission for the further user to the server. This allows the user to advantageously pass access information to the further user, share it with the further user, and/or provide it to the further user. Here and in the following, the user can refer to a first user with a first operating device and the further user can refer to a second user with a second operating device, which may differ from each other. All features of the users operating device described below apply equally to the further operating device of the further user.

In particular, the method allows any and/or any number of users to individually share and/or lend access information for field devices with other users. Depending on the status of the further user, e.g. a service employee, who may have limited access to field devices, or a further employee, who may have unlimited access, the user can share access information with the further user(s) individually via the operating device.

The field device can be any field device for determining any process variable and/or measured quantity. For example, the field device may be a level meter for sensing a level of a medium, such as in a container, a pressure gauge for sensing a pressure of the medium, a flow meter for sensing a flow of the medium, a flow velocity meter for sensing a flow velocity of the medium, a temperature meter, and/or any other field device.

The operating device can be any terminal device that can establish a communication connection with the field device. The operating device and the field device can be independent and/or separate devices. For example, the operating device can be a portable and/or mobile operating device. Alternatively or additionally, the operating device can be a tablet PC, a smartphone, a laptop and/or a computer. The operating device can also be designed as a data goggle, for example. In particular, the operating device may be configured for wireless communication with the field device. Alternatively or additionally, the operating device can also be set up for wired communication with the field device. For connection to the field device, the operating device may have at least one communication module which can establish a communication connection, such as an Ethernet, LAN (Local Area Network), WLAN (Wireless Local Area Network), GPRS (General Packet Radio Service), mobile radio, LTE (Long Term Evolution), 3G, NBIoT, LPWAN, Lora, Bluetooth, 4 . . . 20 mA and/or infrared connection. The operating device can also be connected to the field device (and/or to the server) via a field bus, such as a HART bus, a Profibus, an FF bus, a Modbus, a PROFINET bus, an IP-based bus, an Ethernet IP bus, a serial bus and/or a parallel bus. Other connections, e.g. via an IO-Link and/or a USB connection, are also possible.

The server may include one or more computing devices. The server may also refer to a server network, such as a cloud, or any other computing device. In particular, the server can communicate with the operating device via a network and/or an Internet connection and exchange data and/or signals. For this purpose, the operating device and/or the server may include one or more communication modules for establishing a communication connection, analogous to the communication connections between the operating device and the field device described above.

The operating device may include a user interface for user input. Using the access information for a field device, the operating device can be connected and/or coupled to the field device, for example as a result of user input by the user.

The access information may, for example, include at least one access identifier for enabling the operator to operate the at least one field device. The permission to operate the field device may include, for example, the unlocking of a field device control lock. This may allow the field device to be operated from the operating device. For example, diagnostic data, measurement data, parameterization data, software information and/or any other data can be retrieved from the field device and/or exchanged between the operating device and the field device. This can also enable control and/or monitoring of the field device via the operating device. The access identifier can be, for example, a PIN, a numeric code, a letter code, a numeric letter code and/or another identifier, the entry of which via the operating device can release the field device and/or allow accessing it. It may also be possible to block the field device by entering the access identifier.

Alternatively or additionally, the access information may include at least one connection identifier for establishing a communication connection to the at least one field device. The communication connection can be a Bluetooth connection, a network connection and/or a fieldbus connection. The connection identifier may be a PIN, a numeric code, a letter code, a numeric letter code and/or another identifier for establishing a communication connection. The connection identifier can also be a PSK (Pre-Shared Key), which can be used to connect the operating device to a network to which the field device can also be connected.

The access information for accessing a field device may include the access identifier for enabling the field device and/or the connection identifier for establishing the communication link. Based on the access information, the user can gain access to the field device and unauthorized access to the field device can be effectively avoided.

The disclosed method may allow that a user may select one or more access information for one or more field devices to share with and/or provide to at least one further user via an operating device. The at least one access information can be stored locally on the users operating device in a memory and administered locally, for example by means of an app on the operating device. Alternatively or additionally, the at least one access information can be stored on the server and can be selected via an Internet connection and/or a network connection to the server via the operating device. For example, a user account can be stored on the server for the user, to which the user can log on via the operating device in order to be able to manage the access information associated with the user account and/or assigned to the user. For example, a browser window on the operating device can be used to display and/or control an administration and/or management of access information provided by the server, for example in the form of a list. To log on to the user account on the server, the user can enter an e-mail address and/or a user name and, if necessary, a password or other identifier via the operating device and/or a user interface thereof.

The operating device and/or server may also be configured to synchronize and/or match the access information stored locally on the operating device and the access information associated with and/or assigned to the user on the server (such as the access information associated with the users account on the server). This can ensure that the user always has a complete set of access information assigned to him available for the field devices assigned to him (or his account) on the operating device and/or on the server.

After selecting one or more access information, the user can determine (an/or specify) another user, i.e. the further user, and/or a further operating device and/or assign the determined/specified access information(s) via the operating device in order to share it with the further user. Furthermore, the user can send the access permission, which comprises information and/or data relating to the specified at least one access information and relating to the further user (and/or further operating device) assigned to the specified access information, from the operating device to the server. This can cause the server to release and/or assign the specified access information(s) to the further user based on the access permission. This allows the access information(s) specified by the user to be provided and/or made available to the further user. The further user can thus receive the specified access information(s) via the server. For this purpose, the further user can log on to a user account assigned to him on the server. Optionally, the further user can also load the access information(s) onto the further operating device and store it in a memory, for example.

According to an embodiment, the method further comprises a step of logging on to a user account associated with the user on the server via the users operating device, wherein one or more access information for access by the user to one or more field devices is managed and/or administered in the user account. The access information(s) and/or associated field devices may be associated with the user account of the user on the server. Accordingly, the access information(s) can be associated with the user via the user account on the server. This enables the user to log on to his user account via several operating devices and enables having a complete set of access information available at any time. After logging on to the user account via any operating device, the access information assigned to the user account can be downloaded to the respective operating device and/or compared and/or synchronized with the access information stored locally on the operating device.

According to an embodiment, the method further comprises a step of providing, on the users operating device, a list of a plurality of access information for access to a plurality of field devices via the operating device, wherein the step of determining the at least one access information given to the user comprises selecting and/or marking, on the users operating device, the at least one access information provided or given to the user in the list. For example, the list may include entries with the field devices, such as serial numbers of the field devices and/or further entries. The list allows the user to easily manage the access information or field devices assigned and/or issued to him. This can simplify the sharing of access information with other users.

According to an embodiment, the list is stored in a memory of the users operating device. Alternatively or additionally, the list is provided via an Internet connection and/or network connection of the operating device to the server, for example in a browser window on the operating device. For this purpose, the user can log on to his user account on the server, for example.

According to an embodiment, the method further comprises a step of assigning, determining and/or defining at least one user attribute to the determined at least one access information, wherein the at least one user attribute defines a usage authorization of the determined at least one access information by and/or for the further user. The access permission sent to the server by the operating device further comprises information relating to the at least one user attribute. In other words, the user can assign at least one user attribute to the specified access information, which is to be made available to the further user, which user attribute specifies a usage authorization for the specified access information. The user authorization can be understood as an authorization level, so that the further user can be individually assigned an authorization level for the use of the access information. If, for example, the further user is a service technician, the user attribute can be used to assign a limited usage authorization for the use of the access information. If, on the other hand, the further user is, for example, another employee, the user attribute can be used to define an unlimited usage authorization for the access information. This can significantly increase the flexibility of the procedure for passing on access information with regard to and/or taken account of the status of the further user.

According to an embodiment, the usage authorization defined in at least one user attribute includes at least one element selected from the group consisting of:
  a permanent and/or temporally unlimited authorization for the use of the specified and/or determined access information by the further user;
  a temporary and/or time-limited authorization for use of the specified and/or determined access information by the further user;
  an authorization for use of the specified and/or determined access information by the further user without authorization for viewing the access information by the further user, so that the further user cannot view the access information and/or so that the access information remains hidden from the further user, but can nevertheless be used to gain access to the field device;
  an authorization for use of the specified and/or determined access information by the further user with permission for the further user to view the specified access information; and
  an authorization to change and/or modify the specified access information by the further user.

Alternatively or additionally, the usage authorization defined in at least one user attribute can stipulate that the further user may not change and/or modify the access information. Alternatively or additionally, the usage authorization defined in the at least one user attribute may include an authorization for sharing, distributing and/or passing on the access information by the further user to third parties or to other users. Likewise, the usage authorization defined in the user attribute may stipulate that the further user can only use the access information himself, but may not pass it on. All in all, the access information can be passed on securely and flexibly to other users.

The sharing, passing on and/or lending of access information according to the disclosed method can therefore enable a permanent and/or limited use of the access information by the further user. Overall, this can provide a comprehensive, flexible and simple way to pass on access information to third parties so that the access information can be used by any (further) users, for example via an application, a software, a software application, and/or an app on a (further) operating device to operate field devices.

According to an embodiment, the step of assigning the further user to the specified/determined at least one access information comprises assigning an e-mail address of the further user. Alternatively or additionally, the method can provide for a step of sending a notification to the further user and/or to an e-mail address assigned to the further user. Such a notification can, for example, be sent from the users operating device to the email address assigned to the further user.

Alternatively or additionally, the access permission sent from the operating device to the server may also include information relating to the email address of the further user, wherein sending the access permission from the operating device to the server causes the server to send a notification to the email address assigned to the further user. Specifying the email address of the further user can, for example, enable the server to link the specified access information with the user account of the further user on the server, for example if the email address of the further user is stored on the server for the user account of the further user. Alternatively or in addition to the email address, any other identifier can be used to identify the further user. The sending of the notification may also make it possible for the further user to become aware that the user has passed on and/or shared one or more access information with him.

According to an embodiment, the method further comprises a step of sending, with the operating device to the server, an access deprivation, access cancellation and/or access termination for cancelling a usage authorization of the at least one access information by the further user. In other words, the access information released for the further user can also be revoked for the further user, e.g. by the user. In particular, it can be avoided that the access information must be changed if it is to be ensured that the further user is no longer to have access to the access information. This can increase overall security for the use of access information.

Another aspect relates to an operating device which is configured to perform steps of the method as described above and below. The operating device may, for example, have a memory in which software instructions may be stored which, when executed, e.g. on a control unit and/or a processor of the operating device, cause and/or instruct the operating device to execute steps of the method as described above and below. One or more access information may also be stored in the memory. An application, software and/or app may also be executed on the operating device to enable access to the user account on the server and/or access to one or more field devices.

Characteristics, elements and/or functions of the operating device, as described above and below, may be characteristics, elements and/or steps of the method, as described above and below, and vice versa.

Another aspect relates to a program element and/or computer program which, when executed by an operating device and/or a control unit of an operating device, causes and/or instructs the operating device to perform steps of the method as described above and below.

A further aspect relates to a computer-readable medium on which a program element is stored which, when executed by an operating device and/or a control unit of an operating device, causes and/or instructs the operating device face to perform steps of the method as described above and below.

A further aspect relates to a method for passing on and/or providing access information for access to a field device of process automation and/or the process industry. The method described below can represent, for example, the transfer and/or provision of access information from the server's point of view. All of the above features and/or steps of the above method may apply to the method described below and vice versa. The two methods and/or individual steps may also be combined. The method comprises the following steps:

receiving, with a server, an access permission sent by an operating device of a user to the server, the server storing at least one access information for access to at least one field device, wherein the access permission comprises information relating to the at least one access information and relating to a further user assigned to the at least one access information (and/or specified for being assigned);

generating and/or storing, on the server, a usage authorization based on the received access permission for the further user assigned to the at least one access information; and providing the at least one access information from the server to the further user and/or to a further operating device of the further user.

According to an embodiment, the received access permission further comprises information relating to at least one of the at least one access information and a user attribute associated with the further user, wherein the usage authorization is generated and/or stored on the server based on the at least one user attribute. The server can, for example, process the access permission and/or derive the at least one user attribute from the access permission. Based on the user attribute, the server can then assign the usage authorization, for example in accordance with an authorization level. For this purpose, the server can assign the user attribute and/or the usage authorization defined thereby to the specified access information and/or to the further user.

According to an embodiment, the usage authorization includes at least one element selected from the following group consisting of:

a permanent and/or indefinite authorization for the use of the at least one access information by the further user;

a temporary and/or time-limited authorization for use of said at least one access information by said further user;

an authorization for the use of the at least one access information by the further user without authorization for the inspection of the at least one access information by the further user, so that the access information remains hidden from the further user, but can nevertheless be used to operate a field device;

an authorization for the use of the at least one access information by the further user with the authorization for inspection of the at least one access information by the further user; and an authorization to change and/or modify the at least one access information by the further user.

Alternatively or additionally, the usage authorization defined via the user attribute can stipulate that the further user may not change and/or modify the access information. Alternatively or additionally, the usage authorization defined via the user attribute can stipulate that the further user may or may not pass on the access information.

According to an embodiment, the step of providing the at least one access information to the further user comprises sending the at least one access information from the server to a further operating device of the further user. Alternatively or additionally, the step of providing the at least one access information to the further user comprises enabling the further user to access the at least one access information stored on the server via a further operating device of the further user. In other words, the further user can load the access information released for him from the server to the further operating device and/or obtain access to the access information via an Internet connection (and/or network connection) of the further operating device with the server. Alternatively or additionally, the server can actively send the access information to the further user and/or the further operating device, for example in the form of a push message. It can also be envisaged that, for example, after the further user has logged on to a user account assigned to him on the server, access information on the further operating device and the released access information(s) on the server are synchronised with the further operating device.

According to an embodiment, a user account of the further user is deposited and/or stored on the server, wherein the step of providing the at least one access information to the further user comprises linking, by the server, the at least one access information to the user account of the further user.

According to an embodiment, the step of providing the at least one access information to the further user comprises logging on the further user to a user account of the further user deposited and/or stored on the server via a further operating device of the further user which is connected to the server via an Internet connection and/or network connection. To log on to the user account, an e-mail address of the further user and/or a user name of the further user as well as a password or any other identifier may be required.

According to an embodiment, the access permission received by the server from the users operating device further comprises information relating to an email address of the further user, wherein the step of providing the at least one access information to the further user comprises sending a notification from the server to the email address of the further user. This allows the further user to be notified that the user has provided him with the at least one access information.

According to an embodiment, the method further comprises:
  receiving, with the server, an access deprivation sent by the user and/or the users operating device; and
  cancelling, by the server, the access permission of the at least one access information by the further user based on the received access deprivation.

Accordingly, an access information released for the further user by the user can be withdrawn by the user. This can be done flexibly by the user and/or the operating device of the user. This can also prevent access information from being changed, for example in the event of a change in personnel.

According to an embodiment, the method comprises a step of unlinking the at least one access information with a user account of the further user stored on the server. The server may, for example, in response to receipt of an access deprivation from the user and/or his operating device, remove and/or delete the link between the access information and the user account of the further user so that the further user no longer has access to the access information.

According to an embodiment, the method further comprises a step of sending a deletion command to the further operating device of the further user to delete the at least one access information on the further operating device of the further user. Using the deletion command, the server can, for example, actively delete the access information from the further operating device. Alternatively or additionally it can be provided that the access information(s) which is (are) no longer to be made available to the further user is/are deleted by the further operating device when the further user logs on for the next time, e.g. subsequent to receipt of the access deprivation, to his user account on the server from the further operating device, for example in the context of synchronization and/or comparison of the access information(s) released on the further operating device and on the server for the further user.

Another aspect relates to a server configured to perform steps of the method as described above and below. For example, the server may have a memory in which software instructions may be stored that, when executed, on a controller and/or processor of the server, cause and/or instruct the server to perform steps of the method as described above and below. One or more access information for accessing at least one field device may also be stored in the memory. The memory may also contain one or more user accounts for one or more users. Each user account can contain the access information assigned to the associated user and/or released for this user. An application, software and/or app can also be executed on the server which enables access to the respective user account via an appropriate operating device.

Characteristics, elements and/or functions of the server, as described above and below, may be characteristics, elements and/or steps of the method, as described above and below, and vice versa. Characteristics and/or elements of the server may also be characteristics and/or elements of the operating device and vice versa.

Another aspect relates to a program element and/or computer program which, when executed by a server and/or a controller or processor of a server, causes and/or instructs the server to perform steps of the method as described above and below.

Another aspect relates to a computer-readable medium on which a program element is stored that, when executed by a server and/or a controller or processor of a server, causes and/or directs the server to perform steps of the method as described above and below.

Another aspect concerns a system with one or more operating devices, as described above and below, and a server, as described above and below. The system may be configured to perform the methods described above and below. Optionally, the system may comprise one or more field devices as described above and below.

BRIEF DESCRIPTION OF THE DRAWINGS

Identical, similar or like elements in the figures are provided with identical, similar or like reference signs. The figures are only schematic and not true to scale.

DETAILED DESCRIPTION OF EMBODIMENTS

Figure 1A:
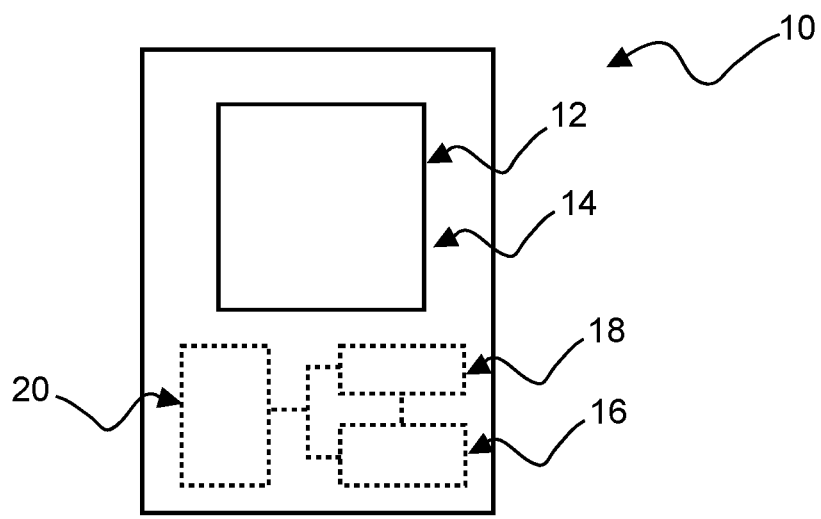
FIG. 1A schematically shows an operating device according to an embodiment.

FIG. 1A shows a schematic example of an operating device 10 according to an embodiment.

The operating device 10 of FIG. 1 is configured as Smartphone 10. However, the operating device 10 can alternatively be a PC, a tablet PC, a computer, a laptop and/or any other terminal device, e.g. data glasses.

The operating device 10 includes a user interface 12 for the input of user inputs by a user of the operating device 10. In addition, the operating device 10 includes a display 14 which can be used to display and/or manage one or more access information for accessing one or more field devices 100 (see FIG. 2). The display 14 and the user interface 12 can be combined, for example in the form of a touch display.

The operating device 10 also includes a control circuit or unit 16, which may, for example, have one or more processors, and a memory 18. The memory 20 may contain software instructions, a program element, a program and/or an app which, when executed by the control circuit 18, cause the operating device 10 to perform steps of the method as described above and below.

Figure 1B:
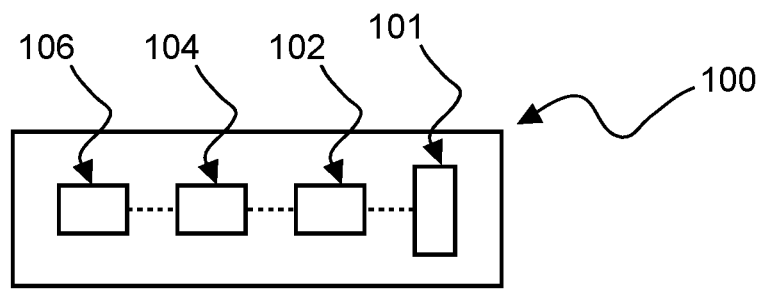
FIG. 1B schematically shows a field device according to an embodiment.
Figure 1C:
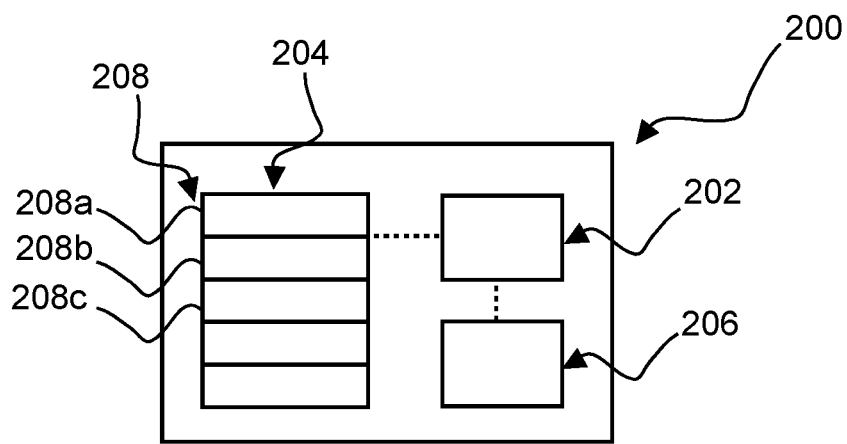
FIG. 1C schematically shows a server according to an embodiment.
Figure 2:
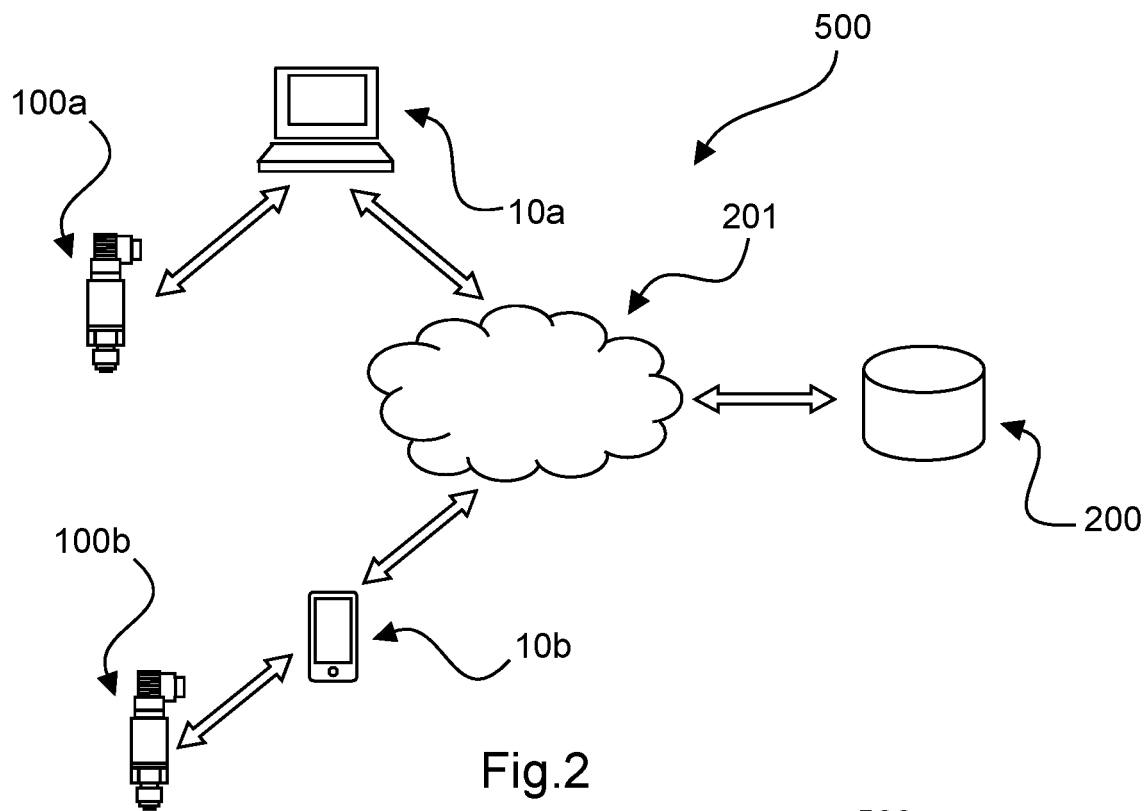
FIG. 2 shows schematically a system with several operating devices according to FIG. 1A, several field devices according to FIG. 1B and a server according to FIG. 1C.
Figure 3:
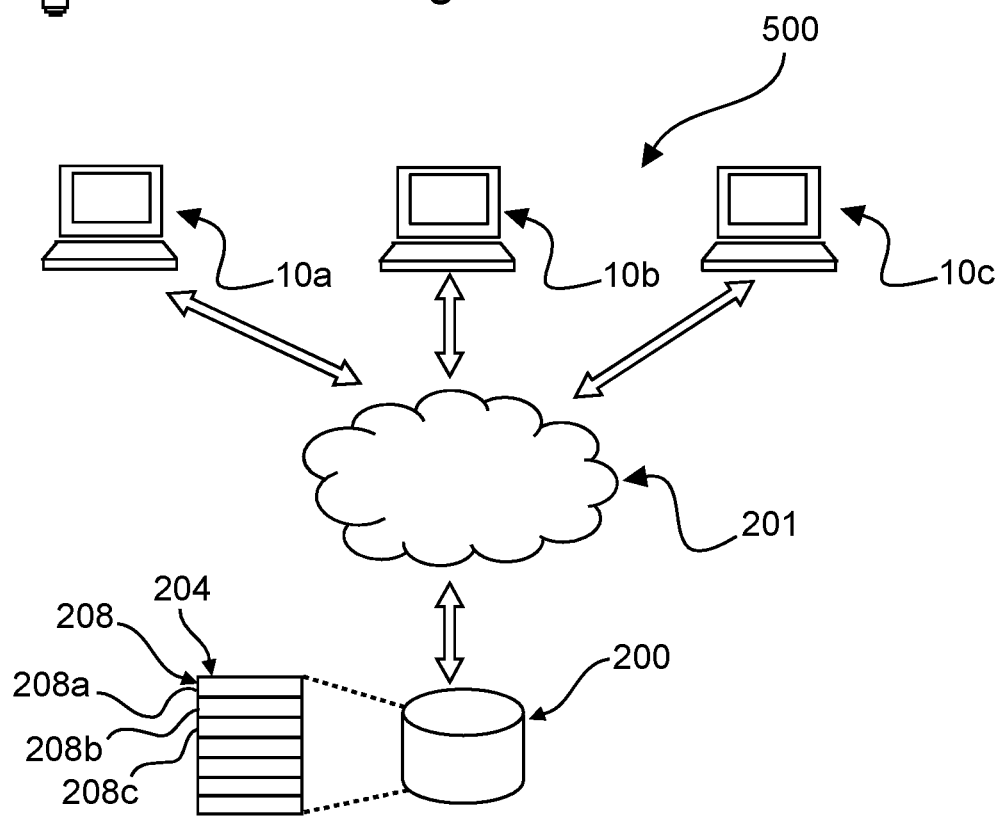
FIG. 3 schematically shows a system for illustrating steps of a method according to an embodiment.

Furthermore, the operating device 10 includes a communication module 20 for establishing a communication connection to one or more field devices 100 and/or for establishing a communication connection to a server 200 (see e.g. FIGS. 1C, 2 and 3). Communication module 20 may be a wireless or wired communication module 20. For example, the operating device 10 can establish a WLAN, a Bluetooth, an infrared and/or a radio connection with one or more field devices 100 and/or exchange data or signals via the communication module 20. The communication module 20 can have several communication units which can be connected to other devices and/or the Internet using different communication protocols. For example, the operating device 10 can establish an Internet connection and/or be connected to the server 200 via the communication module 20 and can also be coupled to at least one field device 100 via a Bluetooth connection. In particular, the operating device 10 can be set up for wireless communication with one or more field devices 100. Alternatively or additionally, however, the operating device 10 can also be set up for wired communication with one or more field devices 100. For connection to one or more field devices 100, the communication module 20 can establish an Ethernet, LAN (Local Area Network), WLAN (Wireless Local Area Network), GPRS (General Packet Radio Service), mobile radio, LTE (Long Term Evolution), 3G, NBIoT, LPWAN, Lora, Bluetooth, 4 . . . 20 mA and/or infrared connection. The operating device 10 can also be connected via a field bus, such as a HART bus, a Profibus, an FF bus, a Modbus, an IP-based bus, an Ethernet IP bus, a PROFINET bus, a serial bus and/or a parallel bus to one or more field devices 100 and/or to the server 200. Other connections, e.g. via an IO-Link and/or a USB connection, are also possible.

At least one access information for accessing at least one field device 100 can be stored in the memory 18 of the operating device 10. In particular, memory 18 can contain several access information for access to several field devices 100. Each access information may, for example, comprise at least one access identifier for enabling the operation of at least one field device 100 by the operating device 10. For example, enabling the operation of field device 100 may include unlocking an operation lock on field device 100. The access identifier may, for example, be a PIN, a numerical code, a letter code, a numerical letter code and/or another identifier, the input of which enables the field device 100 to be enabled. It may also be possible to lock the field device 100 again by entering the access code.

Alternatively or additionally, the access information may include at least one connection identifier for establishing the communication connection to the at least one field device 100. The communication connection may be a Bluetooth connection, a network connection and/or a fieldbus connection. The connection identifier may be a PIN, a numerical code, a letter code, a numerical letter code and/or another identifier for establishing a communication connection. The connection identifier can also be a PSK (Pre-Shared Key), which can be used to connect the operating device 10 to a network to which the field device 100 is also connected.

FIG. 1B schematically shows a field device 100 according to an embodiment.

The field device 100 can be any field device 100 for the determination of any process variable and/or measured variable, e.g. in process automation and/or the process industry. For example, the field instrument 100 can be a level measuring instrument for detecting a level of a medium, for example in a container, a pressure measuring instrument for detecting a pressure of the medium, a flow measuring instrument for detecting a flow of the medium, a flow velocity measuring instrument for detecting a flow velocity of the medium, a temperature measuring instrument and/or any other field instrument 100.

The field device 100 has a sensor 101 and/or a sensor element 101 to detect one or more process variables.

The field device 100 also has a control unit 102 and a memory 104. The memory 104 may contain software instructions and/or a program element for controlling the field device 100.

The field device 100 also includes a communication module 106, via which the field device 100 can be coupled and/or connected to the operating device 10. Analogous to the operating device 10 or its communication module 20, the communication module 106 of the field device 100 can also establish an Ethernet, LAN (Local Area Network), WLAN (Wireless Local Area Network), GPRS (General Packet Radio Service), mobile radio, LTE (Long Term Evolution), 3G, NBIoT, LPWAN, Lora, Bluetooth, 4 . . . 20 mA and/or infrared connection with the operating device 10, for example. The field device 100 can also be connected via a field bus, such as a HART bus, a Profibus, an FF bus, a Modbus, an IP-based bus, an Ethernet IP bus, a PROFINET bus, a serial bus and/or a parallel bus with one or more other field devices 100, with one or more operating devices 10 and/or with the server 200. Other connections, e.g. via an IO-Link and/or a USB connection, are also possible.

FIG. 1C schematically shows a server 200 according to an embodiment. The server 200 can have one or more computing devices. The server 200 can also designate a server network, such as a cloud, or any other computing device.

The server 200 has a control unit 202 and a communication module 206. Using Communication Module 206, the server 200 can establish a communication link with one or more operating devices 10 and/or with one or more field devices 100. In particular, the server 200 may be configured to establish an Internet connection and/or network connection with one or more operating devices 10.

The server 200 also includes a memory 204 in which one or more access information for access to one or more field devices 100 can be stored. In particular, a management module 208 and/or a user account management module 208 can be implemented in the memory of the server 200. In user account management module 208 and/or memory 204, one or more user accounts 208a-c can be stored for one or more users. In particular, a user account 208a-c can be defined for each user who has stored access information(s) on the server. Each user can log on to the user account a208a-c assigned to him with a personal identifier, such as his e-mail address and/or a user name, and with a password, for example via an operating device. This allows each user full access to the access information released for him and/or linked to his user account a208a-c.

In particular, the server 200 can be set up to compare and/or synchronize access information stored locally on a users operating device 10 with the access information stored for the user in his user account 208a-c, e.g. if a user has logged on to his user account 208a-c. The server 200 can also be set up to synchronize access information stored locally on a users operating device 10 with the access information stored for the user in his user account 208a-c, e.g. if a user has logged on to his user account 208a-c.

FIG. 2 schematically shows a system 500 with several operating devices 10a, 10b according to FIG. 1A, several field devices 100a, 100b according to FIG. 1B, and a server 200 according to FIG. 1C.

The double arrows shown in FIG. 2 illustrate schematically a data communication, a communication and/or a data exchange between the components of the system 500.

In particular, the system 500 includes a first field device 100a. The first field device 100a is connected and/or coupled via a communication connection with the first operating device 10a. The communication connection can be established by means of the communication module 20 of the operating device 10a and by means of the communication module 106 of the field device 100a, as explained in the preceding figures.

The system 500 also includes a second 100b field device. The second 100b field device is connected and/or coupled to a second operating device 10b via a communication connection. The communication connection can be established using the communication module 20 of the operating device 10b and the communication module 106 of the field device 100b, as explained in the previous figures.

To establish the communication connection, the operating devices 10a, 10b can use the access information required to access the respective field devices 100a, 100b. This access information can be stored locally on the operating devices 10a, 10b. Each access information can include an access identifier and/or a connection identifier.

Alternatively or in addition, the access information can also be stored on the server 200 and one or both operating devices 10a, 10b can be coupled to the server 200 via an Internet connection 201 and/or network connection 201 to be able to retrieve the access information for the field devices 100a, 100b and/or to establish a communication connection to the field devices 100a, 100b.

Some aspects of the system 500 are summarized below. PCs and laptops with corresponding user programs, such as PACTware with DTM, are regularly used for working with the field instruments 100a, 100b, for example for diagnostics, configuration or the like. In addition or alternatively, work can now also be carried out with tablets and/or smartphones with corresponding apps. As shown in FIG. 2, such operating devices 10a, 10b and their application programs and/or apps can have a connection to the field device 100a, 100b as well as a connection via a network 201 or the Internet 201 to a server 200. The server 200 can be used as a central database for the administration of access information for access of the operating devices 10a, 10b to the field devices 100a and 100b. Network 201 can, of course, also be a WLAN, a mobile connection or a mobile network, for example based on GPRS and/or LTE, NBIoT, LPWAN and/or Lora.

The operating devices 10a, 10b can synchronize access information between several operating devices 10a-b of a user with the aid of the server 200 when establishing the communication connection to the server 200 and/or when logging on to the respective user account 208a-c. The System 500 of FIG. 2 can also be set up to share and/or share access information among different users, as illustrated in FIG. 3 below.

FIG. 3 schematically shows a system 500 for illustrating steps of a method according to an embodiment.

The system 500 of FIG. 3 shows three operating devices 10a-c. Unless otherwise described, the operating devices 10a-c have the same features as the operating devices described in the preceding figures.

The operating device 10a can be assigned to a user A, the operating device 10b to a user B, and the operating device 10c to a user C. The operating devices 10a-c are connected to the server 200 via a network 201, such as the Internet 201, on which a user account 208a of user A, a user account 208b of user B and a user account 208c of user C are stored.

System 500 can be used, for example, to share access information with an external service technician and/or temporary worker, who is referred to in the following as user B with operating device 10b as an example.

User A can be the owner of the access information and manage his access information per field device 100 via his operating device 10a and for example via the user interface 12 on the operating device 10a and/or on a configuration page of his user account 208a in a browser window. In particular, he may mark access information of individual field devices 100 and make it usable for other persons, e.g. for user B, by assigning at least one user attribute and/or an e-mail address of user B to the marked access information. By completing the process, for example by activating a "Share" function, the corresponding user authorization for user B can be triggered on server 200. User B can also receive a notification that new access information has been assigned to him.

For the user attributes mentioned, it can be defined whether the access information is to be assigned permanently or for a limited period of time. In addition, a setting can be selected so that the assigned access information remains hidden for user B. The user attributes can be defined as permanent or temporary. This means that user B can gain access to the defined field devices, but the access information is not displayed.

In general, access information can be shared with other persons, whereby sharing can have different characteristics, which can be defined by at least one user attribute. For example, access information can be shared permanently, access information can be given for a limited time, access information can be assigned "hidden", access information can be assigned visibly, access information can be changed by the recipient, assigned access information can be withdrawn again, and/or shared access information cannot be passed on by the recipient. This allows access information to be securely shared between users on an individual basis.

In another example, access information can be shared with a colleague, who is referred to as user C by way of example. The owner of the access information, user A, can manage his access information per field device 100 via the user interface 12 on his operating device 10a and/or on the configuration pages of his user account 208a, for example in a browser window. In particular, he can mark access information of individual field devices 100 and make it usable for other persons, e.g. for user C, by assigning at least one user attribute and/or the e-mail address of user C to the marked access information. By completing the process, for example by activating a "Share" function, the corresponding user authorization for user C can be triggered on server 200. Optionally, user C can receive a notification that new access information has been assigned to him. In this scenario, the user attribute can preferably be set in such a way that it is used permanently. In addition, a setting can be selected here so that the assigned access information is visible to user C. This means that user C can gain access to the defined field devices and can also change the access information. If the user makes changes, they can be synchronized back to user A.

In the event that user B or C prematurely terminate the activities on the system and are no longer allowed to use the access information accordingly, user A has the option of withdrawing it. Here, too, he can mark individual field devices 100 or access information via his operating device 10a and cancel the sharing for user B and/or C. The user A can also mark individual field devices 100 or access information via his operating device 10a and cancel the sharing for user B and/or C. The user A can also mark individual field devices 100 or access information and cancel the sharing for user B and/or C. In addition, it can also be provided that all access information shared with user B or C can be withdrawn without preselection. The next time an operating device 10b, 10c of user B or C contacts the server 200, the local access information on the respective operating device 10b, 10c can be deleted.

This allows secure and efficient sharing of access information between any users.

Figure 4:
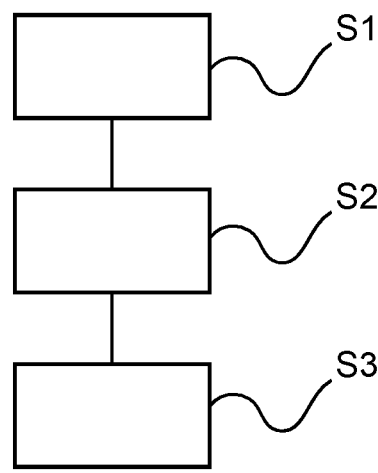
FIG. 4 shows a flowchart to illustrate steps of a method according to an embodiment.

FIG. 4 shows a flowchart illustrating steps of a method for passing access information for an access to a process automation field device 100 according to an embodiment.

In a step S1, at least one access information for an access to at least one field device 100 via the operating device 10, issued to the user, is defined at an operating device 10a of a user.

In a further step S2, a further user is assigned to the specified at least one access information; at the operating device 10a of the user.

In a further step S3, an access permission is sent from the operating device 10a to a server 200, which access permission comprises information relating to the specified at least one access information and relating to the further user assigned to the specified access information, so that the at least one access information is provided to the further user via the server 200 based on the access permission.

Figure 5:
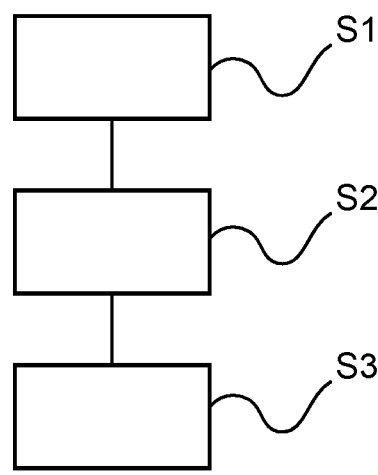
FIG. 5 shows a flowchart to illustrate steps of a method according to an embodiment.

FIG. 5 shows a flowchart illustrating steps of a method of providing access information for access to a field device 100 of process automation according to an embodiment.

In a step S1, an access permission sent from an operating device 10a of a user is received with a server 200 on which at least one access information for access to at least one field device 100 is stored, the access permission comprising information relating to the at least one access information and relating to a further user assigned to the at least one access information.

In a further step S2, a usage authorization is created on the server 200 based on the received access release for the further user assigned to the at least one access information.

In a step S3, the at least one access information is provided from the server 200 to the further user.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method for providing access information for access to a field device for process automation, the method comprising:

determining, in an operating device of a user, at least one access information for provision to the user for access to at least one field device via the operating device;

assigning, at the operating device of the user, a further user to the determined at least one access information;

sending an access permission, which includes information relating to the determined at least one access information and relating to the further user assigned to the determined at least one access information, from the operating device to a server so that the at least one access information is provided to the further user based on the access permission; and providing, on the operator device of the user, a list of a plurality of access information for access to a plurality of field devices via the operator device, sending a notification to the further user and/or to an email address assigned to the further user for notifying that the at least one access information is provided to the further user, wherein the determining the at least one access information for provision to the user includes selecting and/or marking, on the operating device of the user, the at least one access information provided to the user in the list.

2. The method according to claim 1,
wherein the at least one access information includes at least one access identifier for permitting operation of said at least one field device.

3. The method according to claim 1,
wherein the at least one access information includes at least one connection identifier for establishing a communication link to said at least one field device.

4. The method according to claim 1, further comprising:
logging on, via the operating device of the user, to a user account associated with the user on the server, wherein the at least one access information for access by the user to one or more field devices is managed in the user account.

5. The method according to claim 1,
wherein the list is stored in a memory of the operating device of the user; and/or
wherein the list is provided via an Internet connection and/or network connection of the operating device to the server.

6. The method according to claim 1, further comprising:
assigning at least one user attribute to said determined at least one access information, wherein said at least one user attribute defines a usage authorization of said determined at least one access information by said further user; and wherein the access permission sent from the operator device to the server further includes information relating to the at least one user attribute.

7. The method according to claim 6,
wherein the usage authorization defined in the at least one user attribute includes at least one element selected from the group consisting of:
a permanent authorization for use of the determined access information by the further user,
a temporary authorization for use of the determined access information by the further user,
an authorization for use of the determined access information by the further user without authorization for inspection of the determined access information by the further user,
an authorization for use of the determined access information by the further user with authorization for inspection of the determined access information by the further user, and
an authorization to change the determined access information by the further user.

8. The method according to claim 1,
wherein the assigning of the further user with the determined at least one access information includes assigning an email address of the further user.

9. The method according to claim 1,
wherein the notification is sent from the operating device of the user to the email address assigned to the further user.

10. The method according to claim 1,
wherein the access permission sent from the operator device to the server further includes information regarding the email address of the further user; and
wherein sending the access permission from the operating device to the server causes the server to send a notification to the email address assigned to the further user.

11. The method according to claim 1, further comprising:
sending, with the operating device to the server, an access deprivation for cancelling a usage authorization of the at least one access information by the further user.

12. The method according to claim 1, wherein each respective one of the plurality of field devices has distinct access information for access to the respective one of the plurality of field devices.

13. An operating device for providing access information for access to a field device for process automation comprising:
processing circuitry configured to
determine, in the operating device of a user, at least one access information for provision to the user for access to at least one field device via the operating device,
assign, at the operating device of the user, a further user to the determined at least one access information,
send an access permission, which includes information relating to the determined at least one access information and relating to the further user assigned to the determined at least one access information, from the operating device to a server so that the at least one access information is provided to the further user based on the access permission,
provide a list of a plurality of access information for access to a plurality of field devices via the operator device,
send a notification to the further user and/or to an email address assigned to the further user for notifying that the at least one access information is provided to the further user, and
select and/or mark the at least one access information provided to the user in the list.

14. A non-transitory computer readable medium having stored thereon a program element which, when executed on an operating device, causes the operating device to perform steps of the method according to claim 1.

15. A method for providing access information for an access to a field device for process automation, the method comprising:
receiving, with a server, an access permission transmitted from an operating device of a user to the server, the server storing at least one access information for access to at least one field device, the access permission including information relating to the at least one access information and relating to a further user assigned to the at least one access information;
generating and/or storing, on the server, a usage authorization based on the received access permission for the further user assigned to the at least one access information;
providing, to the operator device of the user, a list of a plurality of access information for access to a plurality of field devices for selecting and/or marking, on the operating device of the user, the at least one access information in the list;
providing the at least one access information from the server to the further user; and
sending a notification to the further user and/or to an email address assigned to the further user for notifying that the at least one access information is provided to the further user.

16. The method according to claim 15, wherein the received access permission further includes information relating to at least one of the at least one access information and a user attribute associated with the further user; and
wherein the usage authorization is generated and/or stored on the server based on the at least one user attribute.

17. The method according to claim 15,
wherein the step of providing the at least one access information to the further user includes sending the at least one access information from the server to a further operating device of the further user; and/or
wherein the step of providing the at least one access information to the further user includes permitting the further user to access the at least one access information stored on the server via a further operating device of the further user.

18. The method according to claim 15,
wherein a user account of the further user is stored on the server; and
wherein the step of providing the at least one access information to the further user includes associating the at least one access information with the user account of the further user.

19. A non-transitory computer readable medium having stored thereon a program element which, when executed on a server, causes the server to perform steps of the method according to claim 15.

20. A server for providing access information for an access to a field device for process automation comprising:
processing circuitry configured to
receive, with a server, an access permission transmitted from an operating device of a user to the server, the server storing at least one access information for access to at least one field device, the access permission including information relating to the at least one access information and relating to a further user assigned to the at least one access information, generate and/or storing, on the server, a usage authorization based on the received access permission for the further user assigned to the at least one access information, provide, to the operator device of the user, a list of a plurality of access information for access to a plurality of field devices for selecting and/or marking, on the operating device of the user, the at least one access information in the list, provide the at least one access information from the server to the further user, and send a notification to the further user and/or to an email address assigned to the further user for notifying that the at least one access information is provided to the further user.

* * * * *